United States Patent
Ruehle et al.

(10) Patent No.: US 6,553,428 B1
(45) Date of Patent: Apr. 22, 2003

(54) DISTRIBUTED OBJECT INSTANTIATION OF NATIVE OBJECTS IN JAVA

(75) Inventors: Thomas M. Ruehle, Boulder, CO (US); Gerald D. Boldt, Longmont, CO (US); James R. Carlock, Phoenix, AZ (US); Ronald L. Heiney, Georgetown, TX (US); Raymond L. Knudson, Boulder, CO (US); Stephen E. Stucka, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/972,582

(22) Filed: Nov. 18, 1997

Related U.S. Application Data

(60) Provisional application No. 60/031,026, filed on Nov. 18, 1996.

(51) Int. Cl.[7] .............................................. G06F 15/163
(52) U.S. Cl. ...................................... 709/330; 709/316
(58) Field of Search ................................. 709/102, 202, 709/313, 317, 328, 330, 316; 395/709

(56) References Cited

U.S. PATENT DOCUMENTS

| | | | |
|---|---|---|---|
| 5,367,635 A | | 11/1994 | Bauer et al. |
| 5,546,577 A | | 8/1996 | Marlin et al. |
| 5,566,278 A | | 10/1996 | Patel et al. |
| 5,737,607 A | * | 4/1998 | Hamilton et al. ............ 395/701 |
| 5,815,709 A | * | 9/1998 | Waldo et al. ................ 709/303 |
| 5,867,661 A | | 2/1999 | Bittinger et al. |
| 5,943,496 A | * | 8/1999 | Li et al. ...................... 395/709 |
| 5,944,781 A | * | 8/1999 | Murray ........................ 709/202 |
| 5,961,582 A | | 10/1999 | Gaines |
| 6,125,382 A | * | 9/2000 | Obst et al. ................... 709/102 |
| 6,148,346 A | * | 11/2000 | Hanson ........................ 709/321 |

OTHER PUBLICATIONS

Wollrath et al. A Distributed Object model for Java System Jun. 1996.*
Kramer The Java Platform May 1996.*
Riggs et al. Pickling State in the Java System Jun. 1996.*
Kessler et al. Remote Objects for Java (presentation slides at JavaOne) May 1996.*
Jacquemot et al. Cool: The Chorus Corba Compliant Framework 1994.*
Michael Potter, "serialize MFC objects across the networks", Windows Developer's journal v8 n1 p17(7) Jan. 1997.*
David Flananagan, Java in a nutshell: a desktop quick reference, Chapter 9, May 1997.*
Gosling et al, "The Java language environment:a white paper", 1995.*
Lindholm et al, , The Java virtual machine specification, Chaps. 2, 3, 4 & 7, 1996.*
Author unknown, Java Object Serialization Specification, revision 1.3 Feb. 1997.*
Joe Weber, Special edition using Java 1.1, 3rd ed., Chapter 39, 1997.*
Joe Weber,Special Edition using Java, 2nd edition, Chapter 40, 1996.*
Cliff Berg, "How do I print in Java?", Dr. Dobb's Journal v22 n11 p110(5) Nov. 1997.*
Stubs &Carver, "IPCC++:A C++ Exension for InterProcess Communication with Objects," *IEEE*, 0730–3157/95, 1995, pp. 205–210.

* cited by examiner

*Primary Examiner*—Larry D. Donaghue
(74) *Attorney, Agent, or Firm*—Charles E. Rohrer

(57) ABSTRACT

A triology of methods to send, receive and execute are provided for JAVA process objects on client and server so that instance variables, rather than objects, can be transferred from/to client and server. In that manner, process objects at the server can be instantiated with instance variables from the client without object transfer. The system enables use of non-JAVA process objects at the server to perform functions at the request of a JAVA client.

1 Claim, 11 Drawing Sheets

DISTRIBUTED OBJECT INSTANTIATION OF NATIVE OBJECTS IN JAVA

RELATED PATENT APPLICATION

U.S. patent application Ser. No. 08/972,874, filed Nov. 18, 1997 titled "Virtual Socket for Java Interprocess Communication," filed concurrently herewith, now U.S. Pat. No. 6,401,109, relates to a technique for establishing communication between two JAVA processes on a single system.

This application claims the benefit of U.S. Provisional Application No. 60/031,026 filed Nov. 18, 1996.

Appendix I, referenced in this specification, is submitted on a compact disc, the material thereon incorporated herein by reference, file name of the material is patent.pdf, the disc was created on Dec. 17, 2001 with a size of 3,382 kbytes.

This invention relates to the problem of running non-JAVA objects at a server at the request of a JAVA client.

Appendix I, referenced in this specification, is submitted on a compact disc, the material thereon incorporated herein by reference, file name of the material is patent.txt, the disc was created on Jul. 17, 2002 with a size of 87 Kbytes.

BACKGROUND OF THE INVENTION

JAVA is an object-oriented programming language and also a distributed run time environment. It provides a network computing model in which the client can reside on any platform, the server can reside on any platform and communication between the client and server is enabled over a JAVA physical socket. Objects are passed back and forth between client and server over the Java physical socket. For example, in order to perform a requested function, an object or group of objects are instantiated with the data needed and the object or group of objects are transferred over the socket to the server for execution of the method. Once the results are obtained, the object or group of objects are transferred over the socket from the server to the client.

In order to operate in a JAVA framework, objects at the client and server must be implemented in JAVA. The current invention seeks to obtain the advantage of JAVA in that it can run on any platform, thus enabling the client to have complete freedom in choosing a platform, and still be able to run non-JAVA process objects at the server. This is not possible in current JAVA implementations where JAVA objects are passed back and forth from client to server.

SUMMARY OF THE INVENTION

Instantiation of JAVA process objects is provided in this invention at the server. Instance variables for a JAVA process object are serialized and sent over a JAVA physical socket between client and server. At the server the instance variables are provided to instantiate a JAVA process object identical to the client process object. However, a JAVA virtual machine at the server can access non-JAVA code (for example, functions constructed in native C) and load that code into the instantiated JAVA process object. After executing the functions, the result data is passed by the server over the socket to the client. In that manner, the fact that the function was performed by non-JAVA code is transparent to the client and the requirement of re-formulating non-JAVA process objects into JAVA in order to use them in a network environment is rendered unnecessary.

In the invention, the words client and server are interchangeable, that is, the instantiation process is bidirectional. This enables the server to instantiate an object at the client. In that manner data can be transmitted to several clients, for example, notification of an event on a peripheral device. This invention enables an easy bidirectional method invocation.

The invention is advantageous in that only data is transferred over the socket rather than the whole object or group of objects, thus improving performance time. The invention is particularly advantageous in that non-JAVA process objects can be utilized thus avoiding the requirement of re-coding process objects in JAVA.

To implement the invention, a triology of methods, send, receive and execute are provided in both the client process object and the server process object. In that manner, communication between the two process objects by transferring instance variables is enabled.

The above mentioned and other features and objects of this invention and the manner of obtaining them will become more apparent, and the invention itself will best be understood by reference to the following description of embodiments of the invention taken in conjunction with the accompanying drawing, a description of which follows.

DETAILED DESCRIPTION

Figure 1:
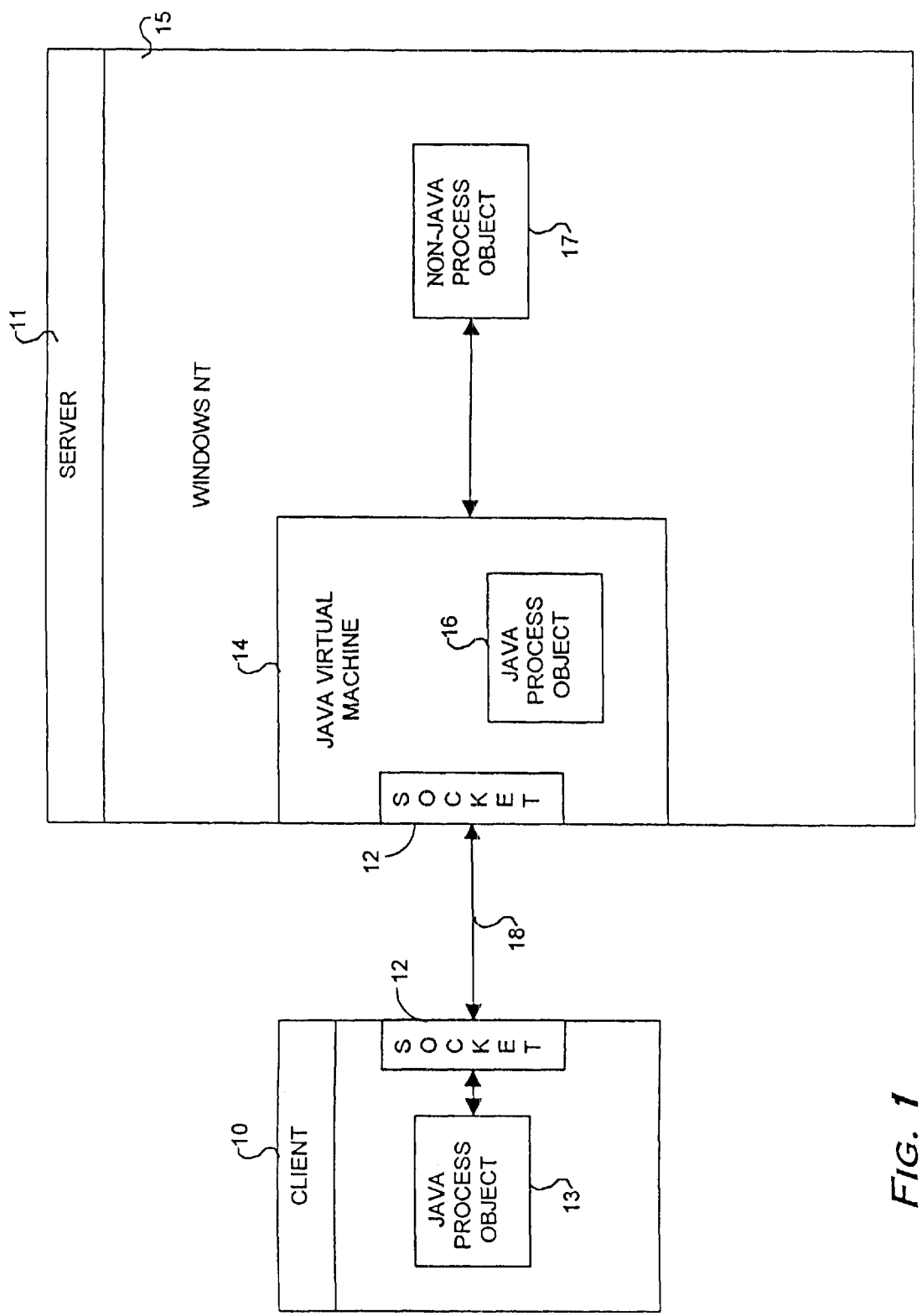
FIG. 1 shows a JAVA client connected to a server over a JAVA physical socket.

It is advantageous to utilize JAVA at the client in a client/server network so that the client can be any computer, any platform and utilize JAVA to communicate with the server system. The server, however, may need to utilize non-JAVA coded objects to perform the tasks requested of it. For example, the server needs the capability of exercising native C code in a Network Printer Manager (NPM) process which operates on a particular platform such as a Windows NT machine. To utilize native C objects, it is necessary to hide that interface from the JAVA client, that is, the inventors realized that instantiation of the object to execute the process at the server must be hidden. In the invention, the JAVA client sends serialized data (instance variables) rather than objects over a socket to the server which passes the data along to a JAVA virtual machine. That machine creates a JAVA process object to receive the data, reconstitute the instance variables and execute the process. The non-JAVA NPM process includes a Dynamic Link Library (DLL) which is loaded by the JAVA virtual machine into the created JAVA process object for communication to a printer. When the job is done, the required data is sent back from the printer to the JAVA virtual machine. The data is serialized and sent back across the wire to the client. When the data is received by the client, it is deserialized and the results are made known to the requesting JAVA object. Note that objects are not sent across the wire but only the instance variables.

In the applet server environment of JAVA, a web browser is used at the client and a Universal Resource Locator (URL) at the server. A JAVA applet is an application invoked by a web browser. An applet is installed only once, in the server, but many clients can take advantage of it. The applet flows across the socket to each client and any new classes needed are brought up automatically by the browser. This technique makes installation easier, it makes maintenance of code much easier, and it takes up less storage room. Actually, the same basic piece of code can be an applet or an application so that if a stand alone computer is used, the JAVA application can be run on it with a JAVA virtual machine.

Note that a socket is one of the primitives in the UNIX operating system; it now appears in many different systems and is used to allow one system to transfer objects or data to another system.

Source code is provided in Appendix I for an example of the invention wherein the function requested is to reverse a line "REVLINE". For example, if a line is XYZ, the result data is ZYX. Such a simple function is utilized for showing the inventive concept while minimizing the amount of extraneous source code needed to describe the invention but necessary to its working execution. The invention can be applied to any function at the server and the invention was initially developed for printer functions. For example, a client can choose a printer which may be remotely located at a print server, configure that printer, and request a print job utilizing already constructed native C process objects by using the invention.

In Appendix I, object 2 creates a socket to communicate with the server and creates streams to use with the socket. The user at the client system can input data on a keyboard and when the Enter key is depressed, the GUI (graphic user interface) causes the action method to be executed. The action method takes the argument (which is what has been typed in) to create a new instance called REVLINE, data for which is serialized and sent to REVLINE, a remote object at the server. The server performs the requested action on the data and then serializes the result and sends the response back. While object 2 provides the output that invokes the remote object it is server object 18 that does it. The other objects shown in Appendix I are the plumbing that puts it all together. Other objects on the GUI include the start object and the stop object which are asynchronous objects whereas the REVLINE is a synchronous object.

Note that object 16 illustrates the reverse line function. REVLINE is invoked at line 24, the message and the count are initialized and SEND-AND-WAIT is exercised. SEND-AND-WAIT is a higher level function which eventually provides a SEND. The lines 40 to 44 package the message, the receive function at line 50 unpackages it and on the server side, the execute method performs the reverse line function, increments the counter and sends it back.

Object 23, Appendix I, shows the synchronous access method with the client SEND, the server SEND, the SEND-AND-WAIT, the client RECEIVE, a server RECEIVE, the server EXECUTE and the client EXECUTE followed by a CANCEL function.

When a message is received by the server across the socket, it takes the first part and tries to create a new class for it; the new class is then instantiated. Creating and instantiating a class are JAVA supplied methods and not a part of the invention. In our example, the class is REVLINE, creating the new object REVLINE. There is a similar "factory" on the client's side to create the object there. Therefore, to put a new remote object in the system, all that is needed is to write to the interface. The new remote object can embody any function, printer, database, software or hardware.

For information on JAVA, reference may be made to "The JAVA Application Programming Interfaces," two volumes, published by Addison-Wesley, New York, N.Y., May 1996, copyright to Sun Microsystems, Inc. 1996.

Note that in the invention all of the objects which implement the transfer of instance variables have a receive method, a send method and an execute method. The send method packages the data, the receive method receives and unpackages the data while the execute method is that function which the object performs. In the example of Appendix I, the send method packages the message and the count and sends it across the wire. At the server the receive method unpackages the data, and the execute method sends it to the object identified in the message header. In the case of the reverse line object, the data is received by its receive method, the line is reversed and [(by utilizing the send method)] the result data is made available to the server which utilizes its send method to send the result data back across the wire. On the client side the receive method accepts the result data and since a callback was supplied in object 23 the result data is routed to the receive method in the designated object at the client. The execute method on the client side is then exercised to end wait.

The invention in a broad sense enables the client to invoke any function present and have anything done it wants on the server without sending an object to the server. It is a method by which the client can instantiate an object, have that data transmitted to the server, have it executed on the server and the results passed back. Since data is transmitted from the client rather than objects, the server process is transparent to the client. In Appendix I, the function (reverse line) is performed entirely in a JAVA remote object, but that is done to provide a simple illustration of remote object instantiation. Non-JAVA remote objects can also be used with the inventive approach as will be shown herein in a printer environment.

In Appendix I, object 2 is an applet and it creates the socket to communicate with a server including the access code. Object 2 creates streams to use the socket, a text field for user input, and a text area for server output. A thread is created to wait for and display the server output. Object 3 provides for the asynchronous sending of messages from the client to the server to the client. Object 4 is the base class for an asynchronous remote object which starts the process on either the server or the client but then does not wait for the process to complete before proceeding. Object 6 is the async thread. Objects 4 and 5 are the asynchronous equivalents of object 23 for sending events from the server side to the client. Object 7, client data, is an object created to hold the socket and asynchronous events coming from the server; it is a container object.

Object 8, the COM message object, packages and unpackages the data. Object 9 is the server connection for the socket. It runs the JAVA factory function to create objects as required by the received data.

Object 10 is the synchronization object at the server and the client. Object 11 initializes sessions and object 12 serializes and deserializes data. Object 13 handles exceptions.

Object 15, repeat line, is like object 16, reverse line, that is, they are both examples of a simple process at the server to respond to a client's request.

Object 17 is like object 12 in that they are both interface objects for serialization. Object 19 is a container object like object 7 holding socket information on the server side.

Objects 20 and 21 are start and stop objects for one-way communication.

Object 22 is the stream listener which contains the factory functions to receive, instantiate, serialize and execute.

Object 24 is a trace program enabling the console to see what is happening.

Utilizing the inventive method, the client can do whatever it wants on the server and it is performed at the server in a manner that is invisible to the client. It is the send, receive and execute trilogy of methods in each object at both the server and the client that enables the communication. At the current time in JAVA it is the whole object that is packaged up and sent across the wire, while in this invention it is only necessary to package the data and send it across the wire. As a consequence there is much less to be packaged and the time it takes to perform the operation is less. The invention recognizes that the method needed to execute the function is already in an object at the server and does not need to be sent to the server. This is especially true in the applet environment which always has the object at the server. The invention takes advantage of the factory provisions in JAVA to create objects as needed, avoiding the need to create and send objects across the wire.

The key problem in the current Internet environment is transmittal time, and this technique improves that situation. Instead of sending an object or group of objects needed to perform a function across the wire, having the functions exercised at the server, packaging the results within the objects and then sending the objects back across the wire to the client, instead the transmittal is simply of serialized data.

Importantly, since the method exercised at the server is transparent to the JAVA client, the invention enables the use of native C code at the server, non JAVA code. Consequently, the method exercised at the server may be in a non-JAVA implemented method. That is completely transparent to the client since whole objects are not sent back and forth—only the data.

FIG. 1 shows a client system 10 and a server system 11 connected by a physical socket 12 and wire 18. Data is sent over JAVA physical socket 12 by JAVA client process object 13 to a JAVA server process object 16. The JAVA physical socket 12 and the JAVA process object 16 are running in JAVA virtual machine 14 on a Windows NT platform 15. The data is sent directly to a JAVA process object 16 as shown in FIG. 1 and also in Appendix I. The data may also be used with a non-JAVA process object 17 through the intermediation of the JAVA virtual machine 14 and the operating system, Windows NT. Once the process method is exercised and the results obtained, the results are sent back through the same elements to the client system 10.

Figure 2:
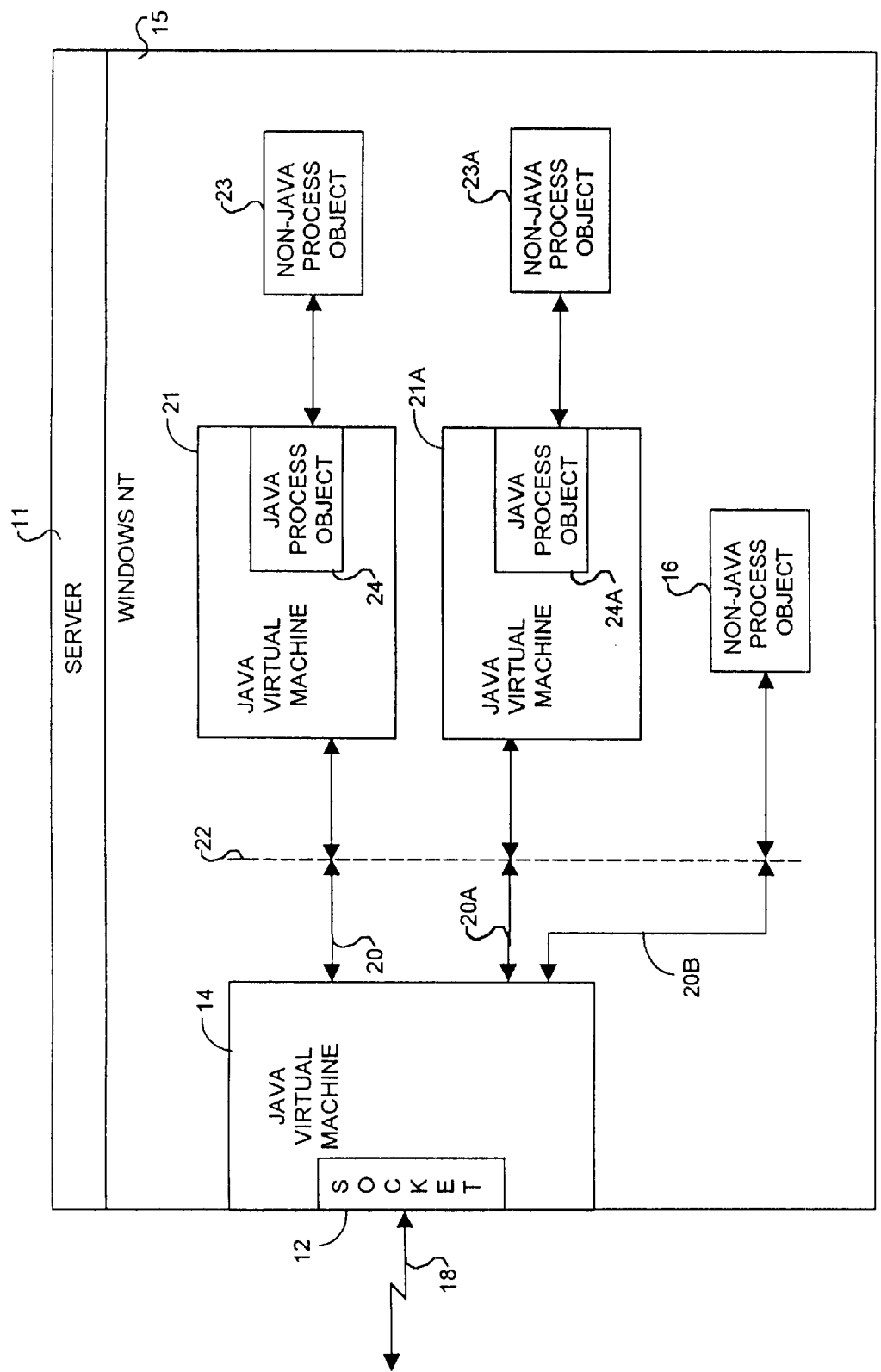
FIG. 2 shows a virtual socket connecting two JAVA processes at the server.

FIG. 2 shows the server system 11 with a server connection thread 20 connected to a first copy 21 of the JAVA virtual machine through a virtual socket 22. The JAVA virtual machine 21 creates a JAVA process object 24 which has the send, receive and execute trilogy of methods to converse over the thread 20 with the send, receive and execute trilogy of methods in client process object 13, FIG. 1. The JAVA virtual machine enables a connection to a non-JAVA process object 23 since both are running on a Windows NT platform 15. While Windows NT is shown as the server operating system, any platform may be chosen insofar as the JAVA virtual machine is concerned.

The virtual socket aspect of the current invention was developed to do JAVA process to process communication on a single system without using a JAVA physical socket. The server exercises a receive process from the socket 12 and does a write on the virtual socket 22. Separate threads are set up for each client requesting the service; otherwise, multiple requesting clients would have to wait until the first client's operation was finished. The reason for that is that the non-JAVA native C DLL's are not re-entrant. Consequently, to service more than one client at a time, a separate copy of the DLL for each client must be present at the server so that a separate thread for each client request can be serviced. FIG. 2 shows a second thread 20A connected by virtual socket 22 to a second copy of the JAVA virtual machine 21A which is connected to a second copy of the non-JAVA process object 23A. JAVA virtual machine 21A has also created JAVA process object 24A to complete the thread from the client to the server.

The virtual socket 22 makes use of the standard-in-standard-out for the server system 11 and is illustrated in object 14 of Appendix I. Typically, the standard-in-standard-out function of an operating system such as Windows NT is used for writing from a file or reading from a file, receiving from a keyboard or writing to a display, whereas in this invention it is used for interprocess communication. The requirement to establish a separate thread for each DLL would generate significant overhead if a JAVA physical socket were used; that overhead is avoided by the use of the virtual socket of this system. Standard-in-standard-out is used herein for the connection thread 20 between the JAVA virtual machine 14 and the JAVA virtual machine 21, that is, standard-in-standard-out implements the virtual socket.

The virtual socket 22 avoids the need for going through layers of code in a physical JAVA socket, perhaps all the way to the network adaptor and then back up through the layers of code to the receiving JAVA process. Since both JAVA virtual machines are running on the same operating system, within this single system the standard-in-standard-out is utilized by the invention in order to avoid the overhead of the usual physical JAVA socket setup.

Figure 3:
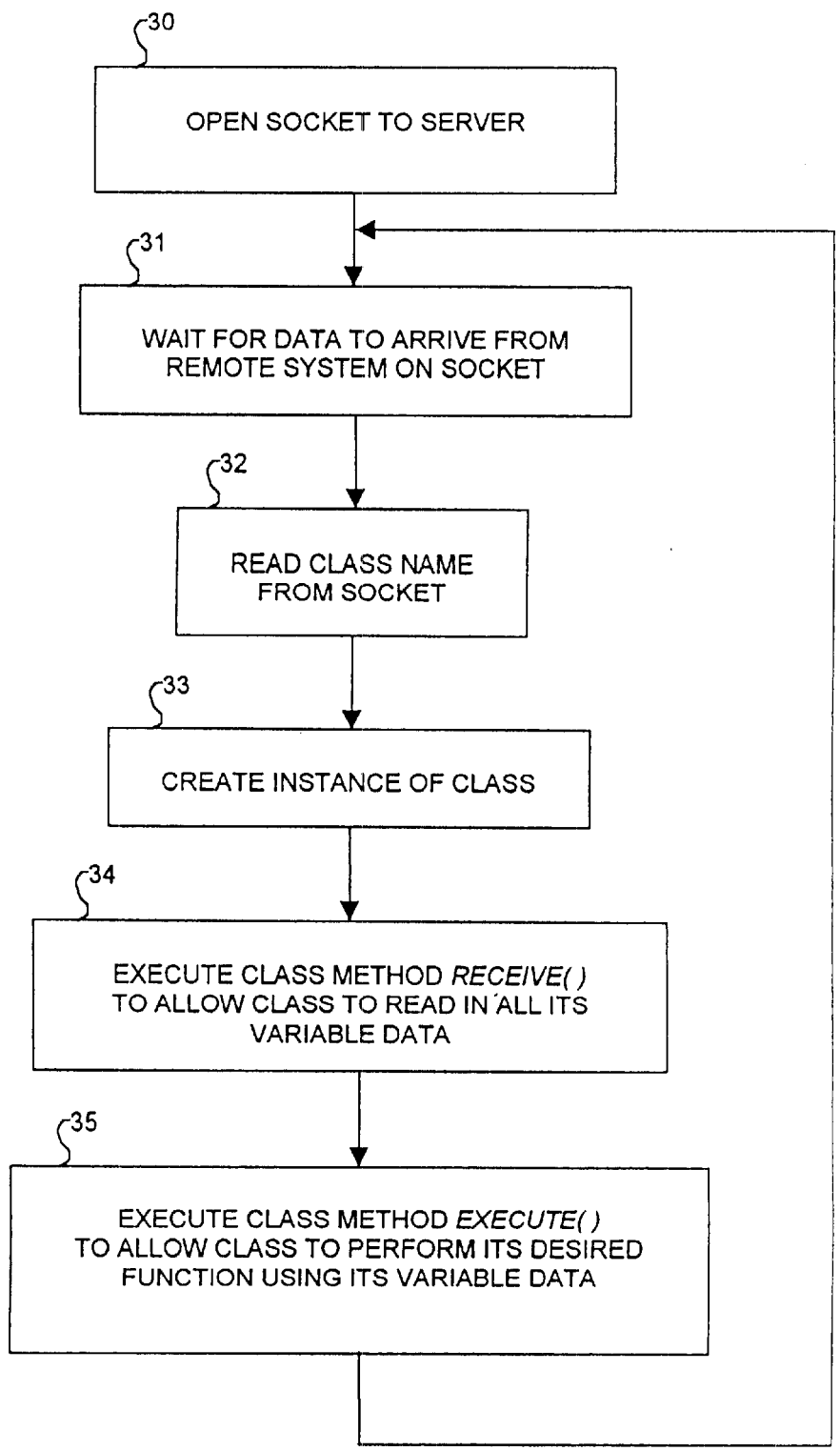
FIG. 3 is a flowchart of the client process.

FIG. 3 shows the process exercised by the client system 10. At step 30 the socket 12 is opened to the server system 11. At step 31 the client system 10 enters a wait state, perhaps better described as a listening state, to wait for data to arrive from the remote server system 11 through socket 12. When data is received, the class name is read from the socket at step 32 and an instance of the class is created at step 33. The receive method is exercised at step 34 so that all of the instance variables are read into the class. At step 35 the execute method is exercised in order to perform the desired function using the instance variables received from the server.

Figure 4:
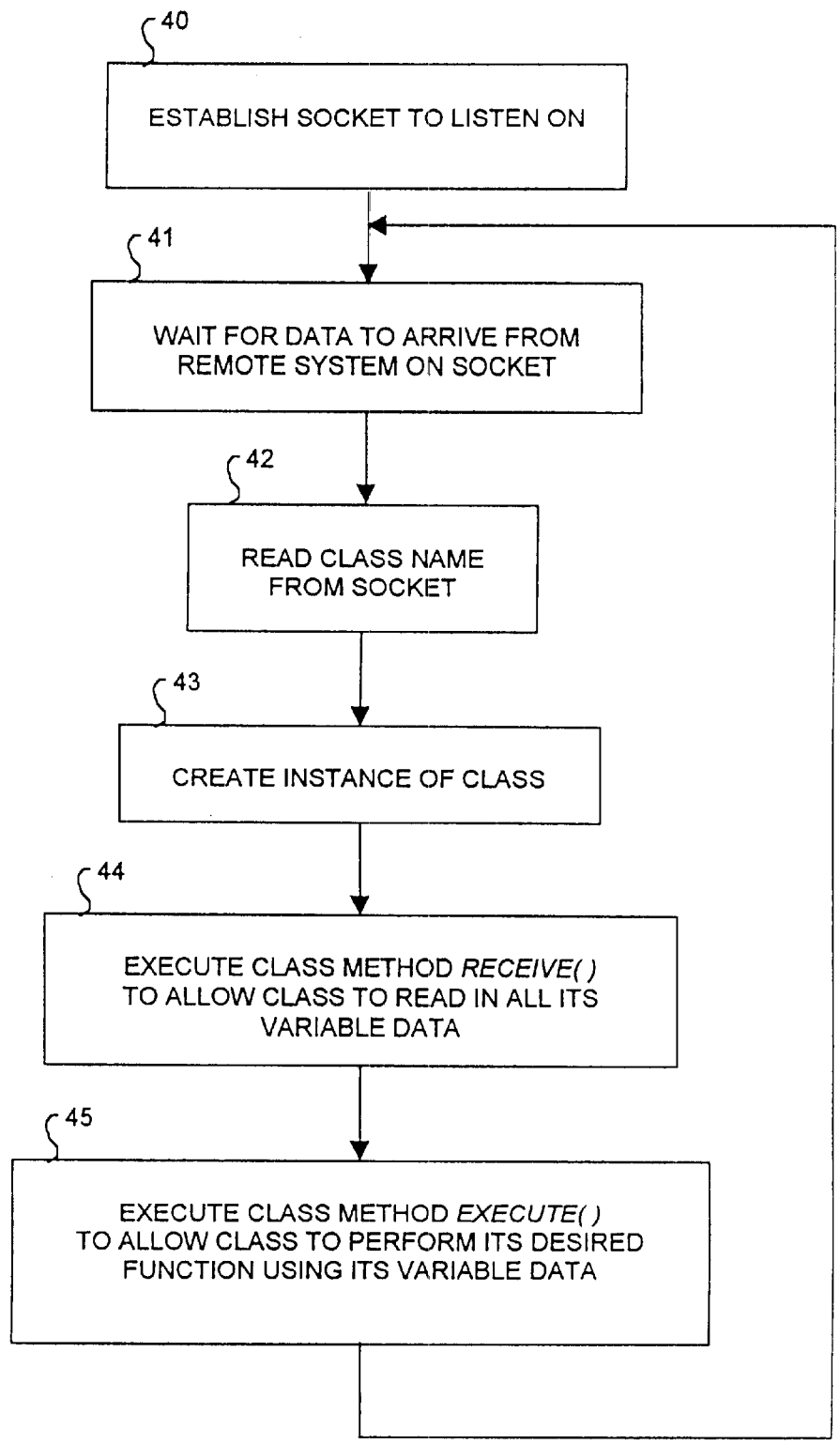
FIG. 4 is a flowchart of the server process.

FIG. 4 shows the process performed by the server system 11. At step 40 the server system 11 listens on socket 12 and waits for data to arrive from the remote client over the socket at step 41. When data arrives the class name is read from the socket at step 42 and an instance of the class is created at step 43. The receive method is executed at step 44 so that the instance variables received from the remote client are read into the class. At step 45 the execute method is performed so that the desired function is exercised using the instance variables.

Figure 5:
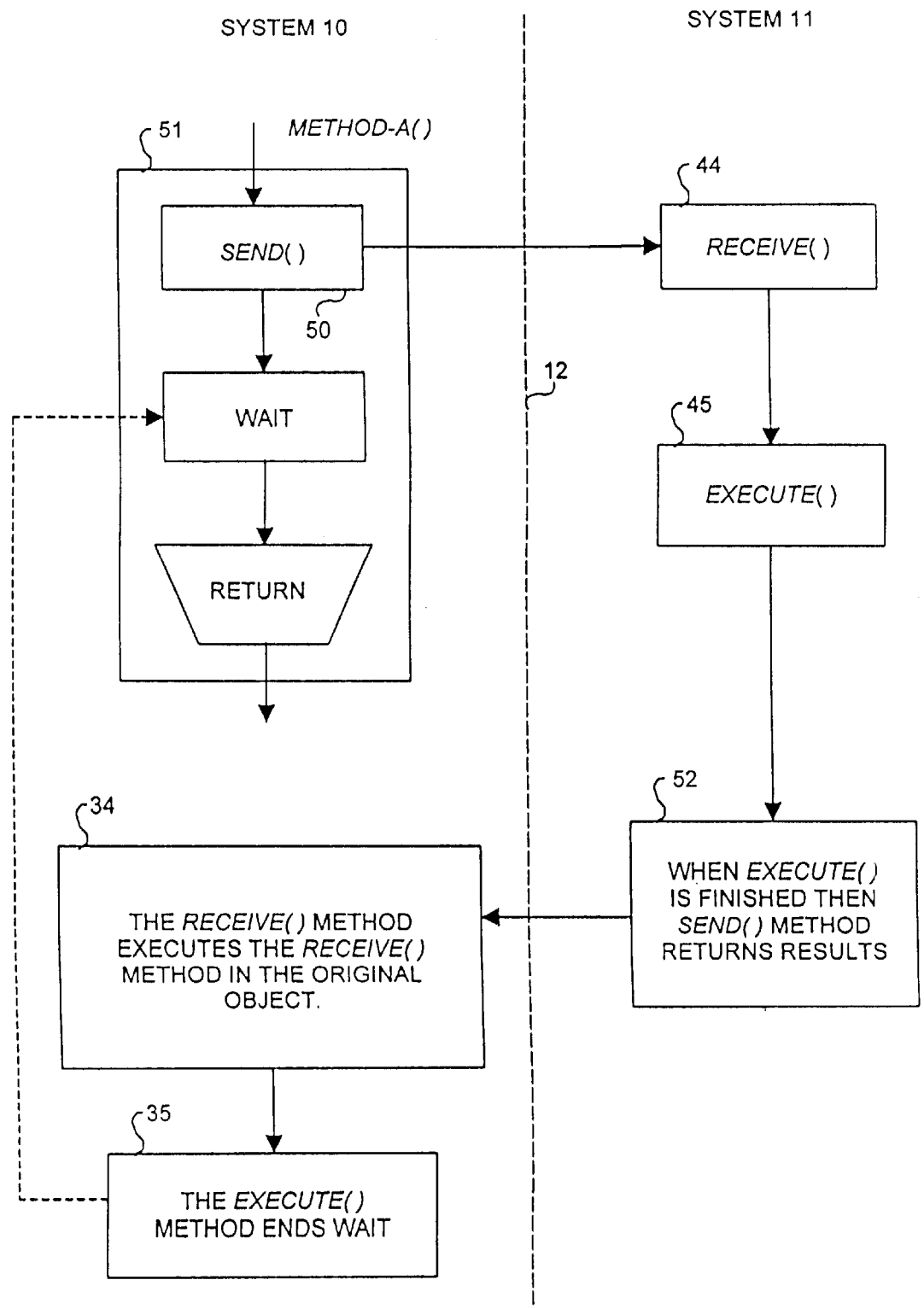
FIG. 5 shows the transfer of data from/to client and server using the invention.

FIG. 5 shows the system of FIG. 1 with the client system 10 on the left side of the figure and the server system 11 on the right side. The two systems are separated by a vertical dashed line which represents the physical JAVA socket 12. FIG. 5 shows how data is returned from a remote object. In system 10, a send method 50 in JAVA instance 51 (corresponds to object 13, FIG. 1) sends the instance variables generated at system 10 across the socket 12 to a receive method 44 which may, for example, be in JAVA process object 16, FIG. 1, or JAVA process object 24, FIG. 2. The execute method 45 is exercised to perform the function requested in accordance with the instance variables, and result data may be produced. Result data is passed to the send method 52 where the data is packaged and sent back across the physical socket 12 to a receive method 34 at the client. The execute method 35 ends the wait state.

In a printer context, the JAVA printer object is instantiated at the client with the instance variables which the user supplies. The printer object includes the method needed to respond to the client's request. In the client server approach of this invention, once the printer request is issued, only the instance variables are sent to the server where the same printer object is instantiated. Only the data and a header identifying the printer object are sent from the client to the server, not the whole object; this technique recognizes that the method to execute the request is in the object at the server as well as in the object at the client. The printer object at the server executes its receive method which builds in the data (the receive being the reciprocal of the send method which is used at the client to package the data), and then executes the execute method to perform whatever action was wanted. When it is finished a return data is sent back across the wire to the receive method at the client object.

In the case of network printer management, this system provides a means for ascertaining the configuration of a printer and changing that configuration according to the needs of the client. Thus the input tray may be designated, the language for the printing may be designated, and designation is made for whatever other capabilities of the printer desired.

Figure 6A:
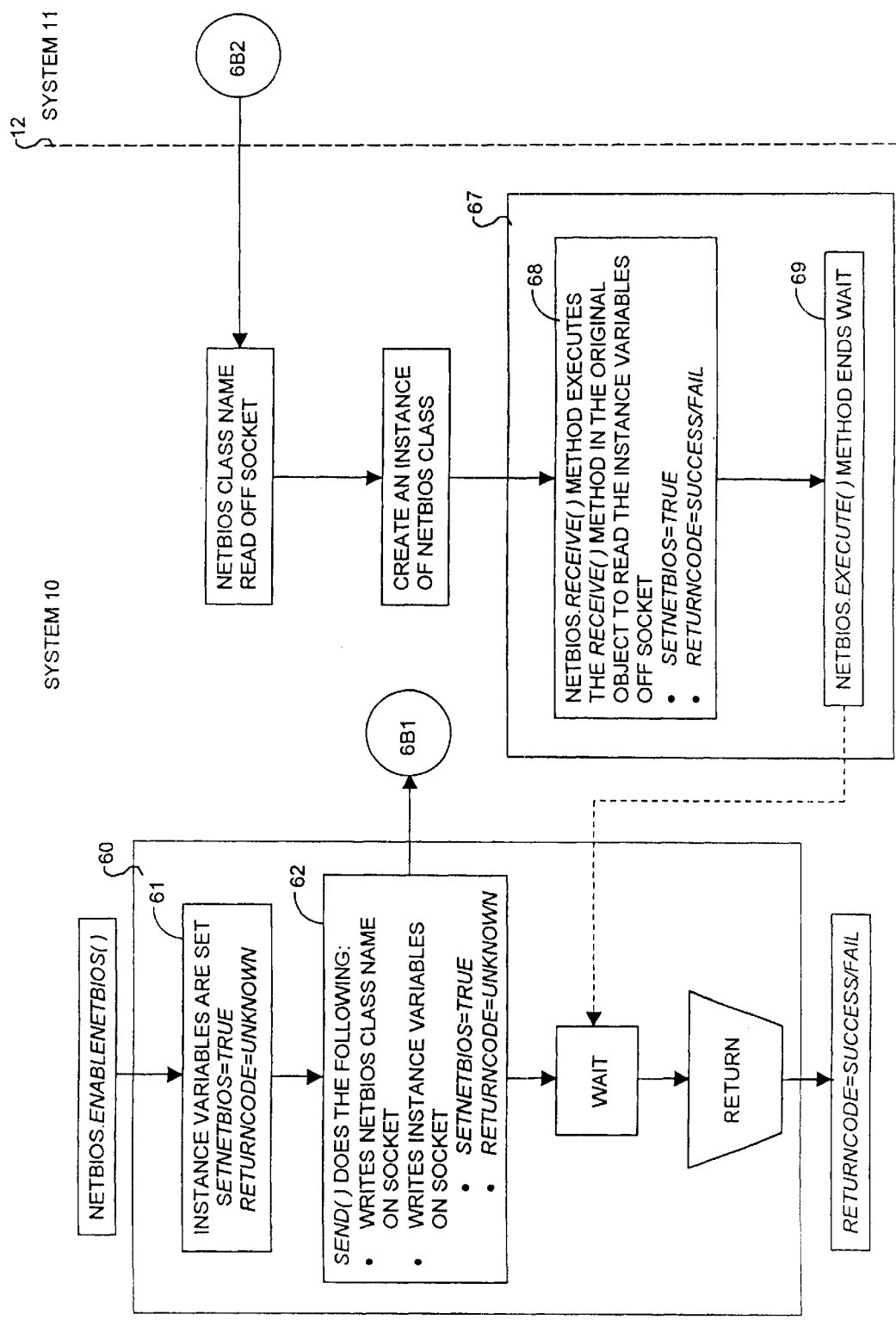
FIGS. 6A and 6B are a printer specific example of data transfer using the invention.
Figure 6B:
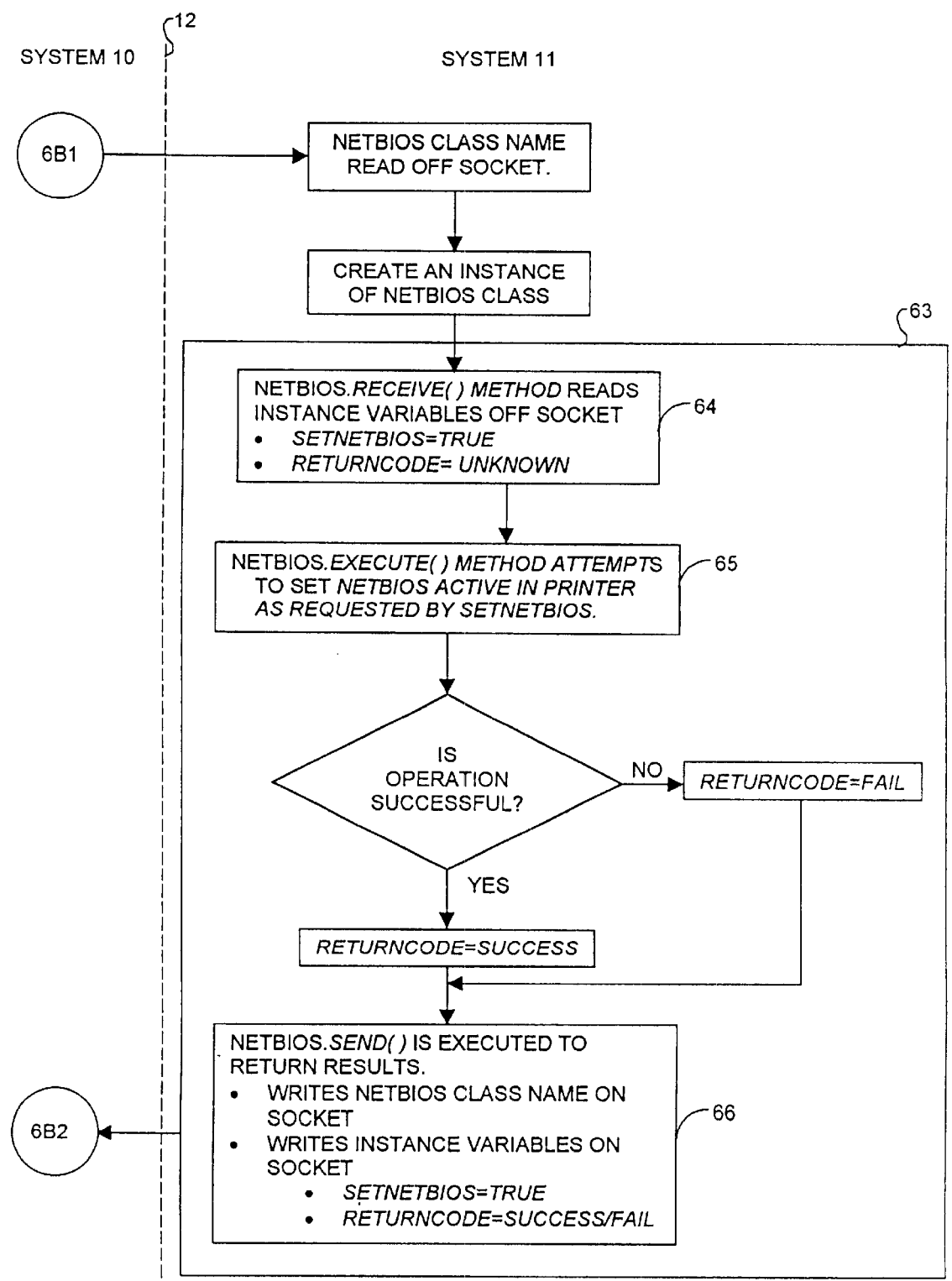

FIG. 6 shows a printer specific example of the system with a netBIOS protocol to establish configuration parameters at a remote printer. In this example a requesting JAVA process object at the client 10 requests the enabling of the netBIOS protocol resulting in the creation of an instance of a netBIOS protocol object 60 at the client. Instance variables are set as shown at step 61 and at step 62 the send method writes the netBIOS class name on the socket 12 together with the variable instance data. The data is sent across the socket 12 to server system 11 where the netBIOS class name is read off the socket resulting in the creation of an instance 63 of the netBIOS class object. The receive method of the netBIOS object is exercised at step 64 to read the instance variables off the socket and the execute method 65 attempts to set the netBIOS active in the printer as requested by the client. If the operation is successful at the printer, a return code equalling success is received at object instance 63 and at step 66 that return code is sent by the send method across the socket to the client. The client reads the netBIOS class name off the socket and creates an instance 67 of the netBIOS class. At step 68 the receive method is executed to read instance variables off the socket, that is, that the netBIOS has been established and a return code equal to success has been received. The netBIOS execute method is exercised at step 69 to end the waiting of the object 60 on the socket. After the completion of its function, objects 63 and 67 are no longer needed and may be garbage collected.

Figure 7:
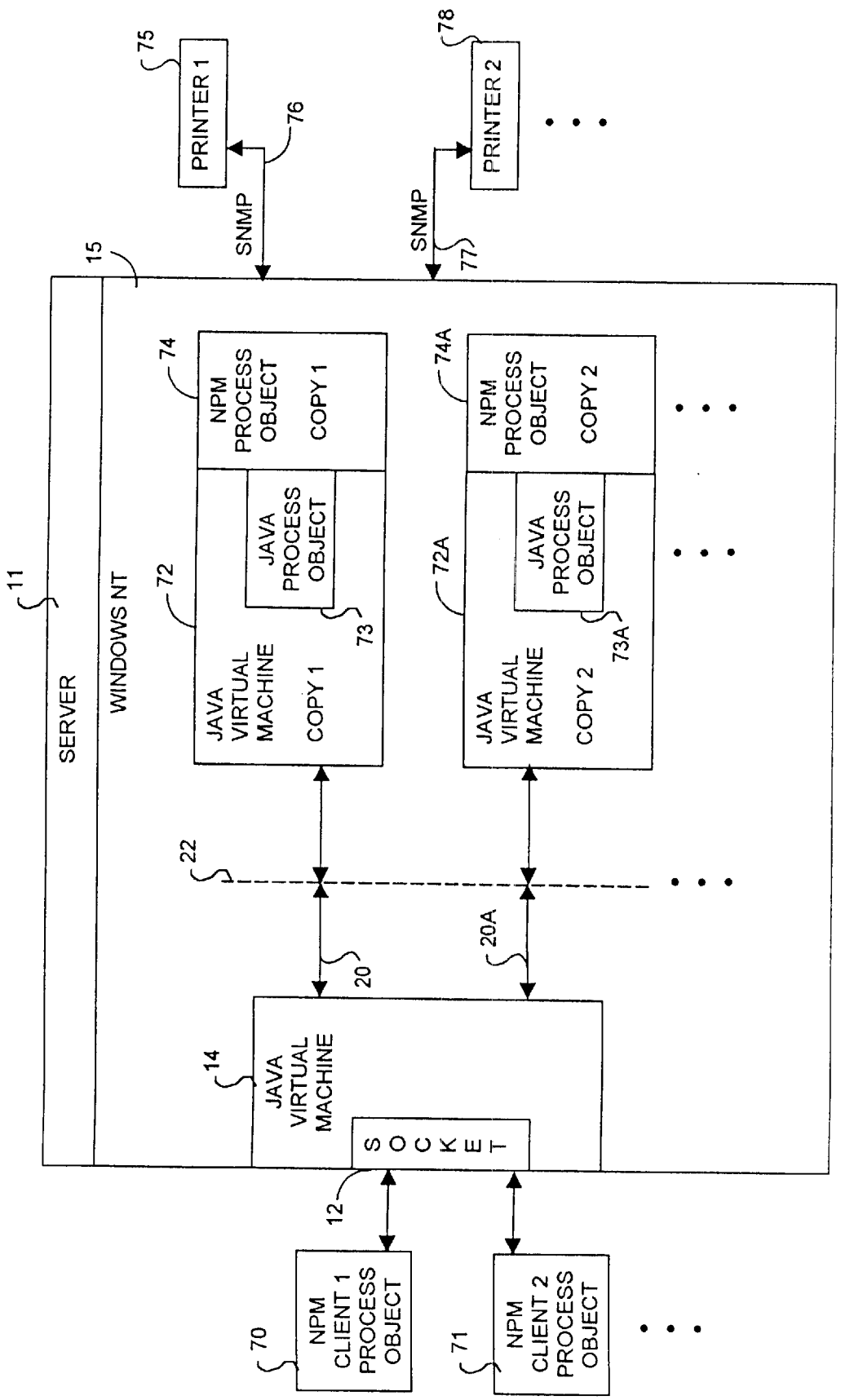
FIG. 7 shows a multi-thread arrangement with virtual sockets allowing several clients to simultaneously access printers connected to the server.

FIG. 7 shows the server system 11 with Windows NT platform 15. Multiple clients 70 and 71 are connected to the server 11 across socket 12. Each of these clients is shown as a Network Printer Manager (NPM) client for establishing a session with a printer connected to the server 11. JAVA virtual machine 14, upon which socket 12 runs, establishes a server thread 20 for client 70 to connect by virtual socket 22 to a first copy 72 of a JAVA virtual machine. JAVA virtual machine 72 creates a JAVA process object 73 to receive the instance variables and machine 72 loads the DLL of the non-JAVA Network Printer Manager (NPM) process object 74 into JAVA process object 73 to enable it to communicate with printer 75. The instance variables are used by the process object 73 to request performance of some function, for example, the enablement of netBIOS for printer 75 through the use of a Simple Network Management Protocol (SNMP) connection 76.

NPM process object 74 is formulated in native C and is not reentrant. Consequently, without either a virtual or a JAVA physical socket, NPM client 71 must wait until NPM client 70 is finished even though client 71 seeks to use another printer 78. The virtual socket aspect of the invention negates that wait by client 71 and negates the overhead of a JAVA physical socket. The invention enables JAVA virtual machine 14, which is connected to receive instance variables from client 71 over socket 12, to establish a second connecting thread 20A to a second copy 72A of the JAVA virtual machine. This enables the instance variables from client 71 to instantiate JAVA process object 73A which is created in machine 72A. A second copy of NPM process object 74A is made to communicate with machine 72A so that non-JAVA code can be loaded into JAVA process object 73A to enable SNMP transmission 77 to printer 78.

Figure 8:
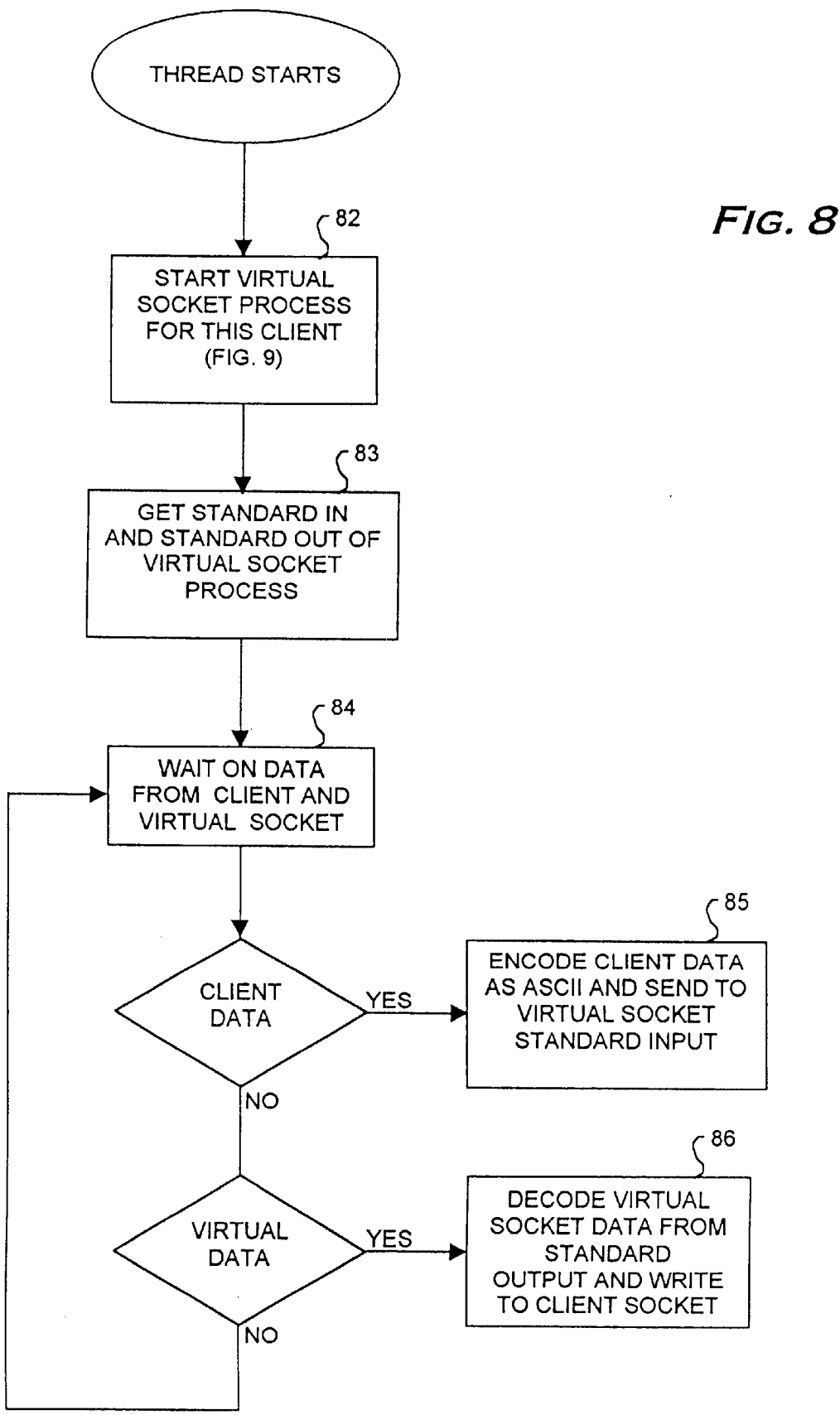
FIG. 8 is a flowchart of the virtual socket process.
Figure 9:
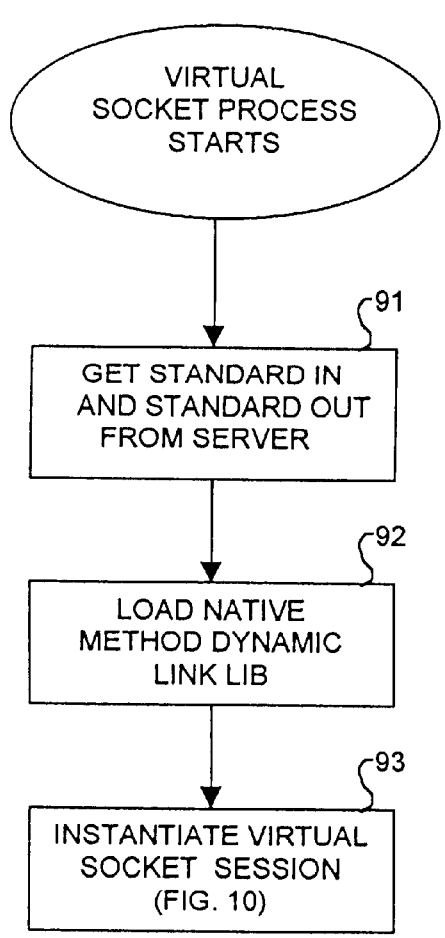
FIG. 9 shows details of setting up the virtual socket and communication to a non-JAVA process object.

FIG. 8 illustrates the process performed at the connecting thread 20 in more detail. At step 82 a virtual socket is established for the client connected to that particular thread. Details are shown in FIG. 9. At step 83 the standard in and standard out of the operating system in use on the server system 11 is obtained for the virtual socket process and at step 84 a wait state is entered to listen for data from either the client over its socket or from the JAVA virtual machine over the virtual socket. If client data is received, then it is encoded at step 85 and sent to the virtual socket utilizing the standard input process If data is received on the virtual socket, it is decoded from the standard output process and written to the client socket at step 86.

In FIG. 9, when the virtual socket is established, the standard in and standard out procedure is received from the server system 11 at step 91. It should be noted that every system has a standard in and standard out procedure which is used, for example, when the keyboard is used; it is the standard in procedure that receives the keyboard input data and provides the data to a standard out procedure for writing on a display screen. It is that standard in and standard out procedure, which every system has, which is utilized in the virtual socket. A Dynamic Link Library is loaded at step 92 for communication between the virtual machine and a non-JAVA process object. The virtual socket session is instantiated at step 93 with details shown in FIG. 10.

Figure 10:
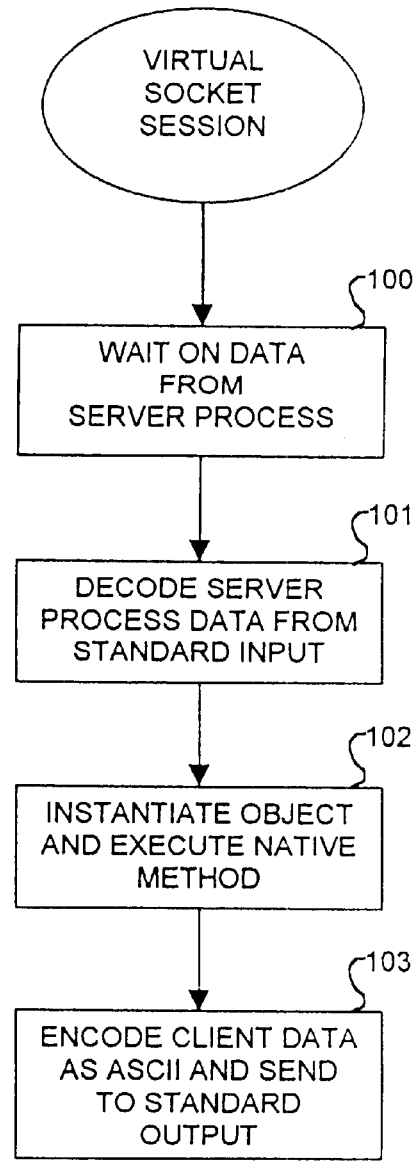
FIG. 10 illustrates a virtual socket session.

FIG. 10 shows that when a virtual socket session is established the virtual socket waits on data from the server process (JAVA virtual machine 14) at step 100. When data is received from the standard input, it is decoded at step 101, an object 73 is created by virtual machine 72 and the object 73 is instantiated for performance of an execute method at step 102. At step 103 result data is sent to the standard output. Encoding is done in ASCII format.

Figure 11:
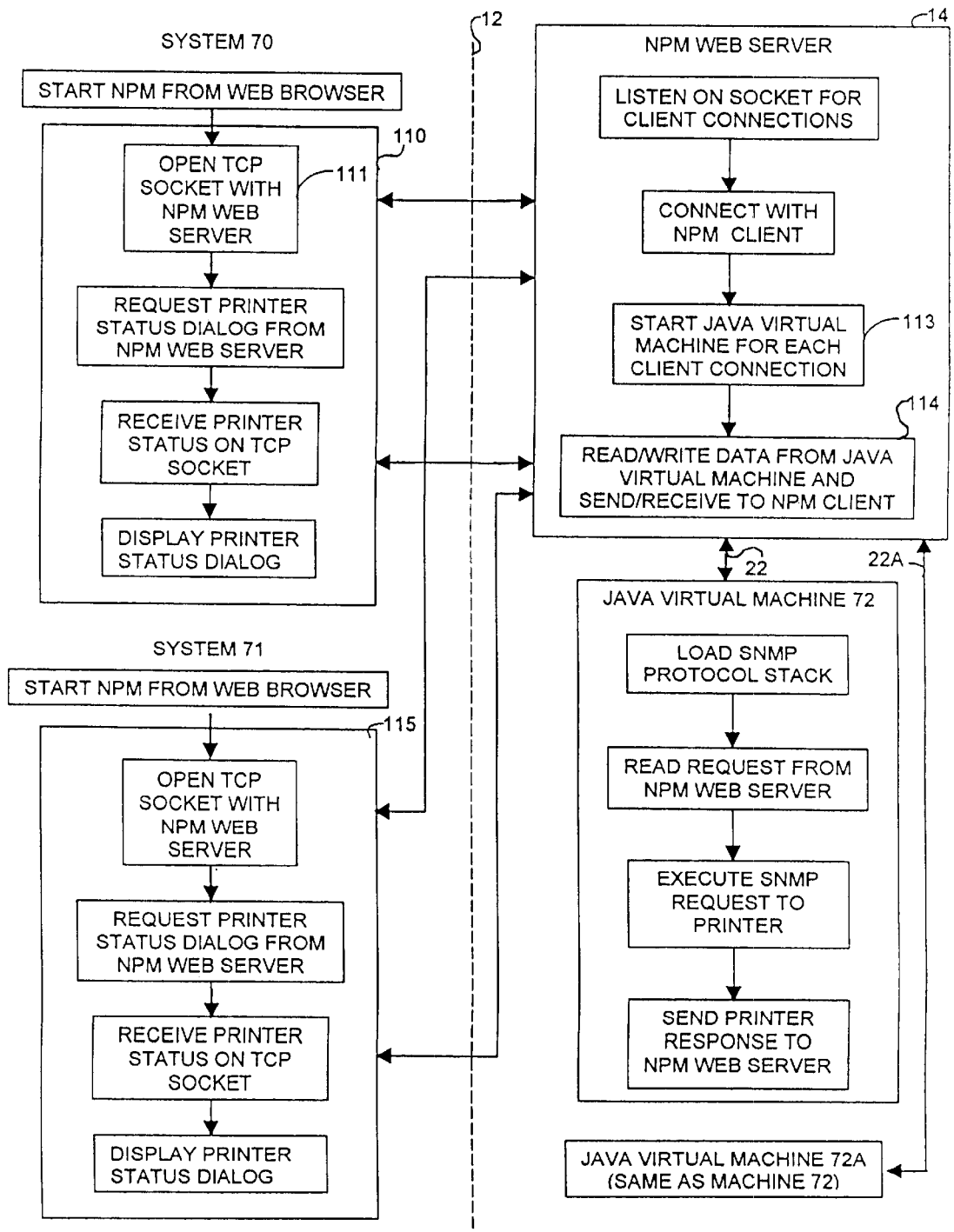
FIG. 11 is a printer specific example using virtual sockets for multi-thread communication.

FIG. 11 shows a printer specific example of the use of the virtual socket. A client system 70 is shown on the left side of FIG. 11 and a server system 11 is shown on the right side with a dashed line representing socket 12 down the middle of the figure. System 10 utilizes a web browser to request the start of the remote Network Printer Manager (NPM), and in so doing causes an instance 110 of a JAVA NPM object to be created. Socket 12 is opened as shown at step 111, and data is sent across the socket by TCP protocol to the server system which is listening with a web server on its well known physical socket for client connections. When the NPM web server receives data for the NPM process object, an instance 112 is created at the server for receiving the data, starting a first copy 72 of a JAVA virtual machine at step 113 and sending the data across a virtual socket 22 to the JAVA virtual machine 72. The virtual machine 72 creates a JAVA process object 73 (FIG. 7) to receive the data and loads SNMP protocol utilizing the DLL of the NPM non-JAVA process object 74 (FIG. 7) in order to execute the SNMP request to the printer.

The non-JAVA NPM SNMP protocol communicates with a printer to perform a print request. When the request is completed, return data from the printer is received by the JAVA virtual machine 72 and sends that data in step 114 across the socket to the client system 10 where the instance variables are received, and processed.

FIG. 11 illustrates that, for a second network printer manager client 71, the same process is followed to instantiate an object 115 for opening a socket to the server system 11 for the creation of a JAVA virtual machine 72A (identical to machine 72) to handle requests from client 71. JAVA virtual machine 72A performs in the same manner as JAVA virtual machine 72. Thus, multiple clients are handled simultaneously although the non-JAVA code is not reentrant.

While the invention has been described above with respect to a specific embodiment, it will be understood by those skilled in the art that various changes in form and detail may be made therein without departing from the spirit and scope of the invention which receives definition in the following claims.

What is claimed is:

1. A system for enabling multiple JAVA clients to communicate with a server by sending instance variables for instantiating process objects on said server and enabling said server to communicate with said multiple JAVA clients comprising a JAVA physical socket connection between each Java client and said server, said server comprising a JAVA virtual machine;

a JAVA client process object at each client with a send method, a receive method and an execute method for transferring instance variables;

a copy of said JAVA virtual machine established at said server for each client;

a JAVA server process object with said copy of said JAVA virtual machine for each client with send, receive and execute methods for transferring instance variables;

a connection thread established for each client at said server with a virtual socket for each said connection thread enabling interprocess communication between said JAVA virtual machine and said copy of said JAVA virtual machine for each client; and a copy of a non-JAVA process object at said server for each client wherein said JAVA server process object is enabled to cooperate with said non-JAVA process object to perform a function.

* * * * *